United States Patent [19]

Danielson

[11] Patent Number: 5,258,050

[45] Date of Patent: * Nov. 2, 1993

[54] LEAK DETECTION SYSTEM

[75] Inventor: Philip Danielson, Downers Grove, Ill.

[73] Assignee: Danielson Associates, Inc., Lisle, Ill.

[*] Notice: The portion of the term of this patent subsequent to Sep. 17, 2008 has been disclaimed.

[21] Appl. No.: 744,955

[22] Filed: Aug. 14, 1991

Related U.S. Application Data

[63] Continuation of Ser. No. 604,329, Oct. 29, 1990, Pat. No. 5,049,168.

[51] Int. Cl.$^5$ .............................................. B01D 57/00
[52] U.S. Cl. ............................................ 55/17; 415/90
[58] Field of Search ....................... 55/17, 270; 415/90

[56] References Cited

U.S. PATENT DOCUMENTS 4,746,265  5/1988  Luijten .................................... 415/90
5,049,168  9/1991  Danielson ................................. 55/17

FOREIGN PATENT DOCUMENTS 3616319  7/1987  Fed. Rep. of Germany .

Primary Examiner—Charles Hart
Attorney, Agent, or Firm—Milton S. Gerstein; Marvin N. Benn

[57] ABSTRACT

A method of separating a lighter gas from heavier gases. A series of pumps is used. A gas to be separated out from a mixture of gases is introduced at an exhaust port of one of the pumps, with the lighter gas among them traveling upstream into a container.

6 Claims, 1 Drawing Sheet

LEAK DETECTION SYSTEM

This is a continuation of co-pending application Ser. No. 07/604,329 filed on Oct. 29, 1990, now U.S. Pat. No. 5,049,168.

BACKGROUND OF THE INVENTION

The present invention is directed to a system for detecting air leaks in vessels and containers in which a vacuum is formed. Leak-detection in vessels and containers used in a vacuum environment is well-known, such detection utilizing the detection of leaks of helium previously pumped into the vacuum vessel expressly for the purpose of detecting potential leaks. Helium leak-detection is possible owing to the lightness of the gas and its concomitant small molecular size, allowing detection of even the smallest hole or tear. The leaking helium is detected by a simple and conventional mass spectrometer that is designed to detect only helium gas. However, for such a mass spectrometer to operate effectively, such must be evacuated to high vacuum, which allows the probe, or leaking, helium to be drawn into the detecting chamber of the mass spectrometer, and detected by the helium-sensing head. However, since the probe helium gas is traveling from an essentially atmospheric pressure environment to one of very high vacuum in the detecting chamber of the mass spectrometer, complicated and expensive variable-leak throttling valves are required to allow for the introduction of the higher pressure helium into the detection chamber of the mass spectrometer so that the helium sensing head thereof is not adversely affected by a rise in pressure. The complex throttling valve allows for such introduction. In order to sustain the high vacuum in the detection chamber of the mass spectrometer, a high vacuum pump is required. The original pump used was a high-vacuum oil diffusion pump. Since oil vapors from the pump would contaminate the mass spectrometer sensing head, liquid nitrogen traps were employed to freeze out the oil vapors before reaching the sensing head. The use of liquid nitrogen was and is a difficult and costly process, as well as requiring the maintenance of an adequate supply.

An alternative to the use of oil diffusion pumps has been the use of turbomolecular pumps, which has only been commonplace within the last few years, owing to the refinement and development of these kinds of pumps. The turbomolecular pump is essentially an axial-flow molecular turbine having a plurality of alternatively-arranged slotted rotating blades and stationary stator blades, with the relative velocity between the two sets of blades making it highly probable that a gas molecule will be transported from the pump inlet to the pump outlet. Since the gas is compressed only slightly by each stage, a series of such blades are required to achieve an effective compression ratio and workable and effective pressure differential. The turbomolecular pump deals with molecular flow, with compression achieved via momenta-transfer from the high-speed rotating blades to the gas molecules. The operating exhaust pressure is in the range of about 30 millitorr, which extremely low pressure, like the oil diffusion pump, has required complex and expensive throttling valves to allow for the introduction of the probe helium gas into the sensing probe chamber, as explained above. The use of the turbomolecular pump, however, was an advancement in that it more effectively prevented the simultaneous introduction of oil vapors, though such was not completely eliminated as a problem, since an oil-sealed mechanical pump was required in series with the turbomolecular pump in order to achieve and sustain such extremely low operating pressures. The additional advantage provided was the fact that turbomolecular pumps will pump heavy gases more readily and easily than lighter gases, such as helium, so that the technique of "Back-Diffusion" or "Counter-Flow" was developed using the turbomolecular pumps, by which the probe helium gas to be detected was introduced at the outlet or exhaust of the turbomolecular pump, with the probe helium diffused rearwardly through the turbomolecular pump until it reached the sensor probe of the mass spectrometer, the heavier air molecules having been "filtered out" or selectively eliminated by this process. The laws governing such diffusion are based on molecular flow and statistical. However, as stated above, complex throttling valves are still required owing to the extremely low exhaust pressure at the pump outlet.

The present invention is directed to a considerably improved helium-leak detection system by which the detection-sensitivity is increased, oil-vapor diffusion is completely obviated, and the use of a throttling valve is eliminated. The present invention has achieved such a remarkable and improved leak-detection system by the use of a relatively recently-developed molecular drag pump instead of the turbomolecular pump above-described. The molecular drag pump, which includes the Gaede molecular drag pump, as well as the modern and greatly advanced version of the old Holweck pump, compresses a gas along the axial flow-direction, in contradistinction to the turbomolecular pump which imparts compression transversely to the flow-direction. In the disc-type molecular pump, such compression is achieved by a rotating rotor in which is formed a series of precisely-aligned and formed spiral grooves that cooperate with several parallel helical grooves formed in the stator. The use of the molecular drag pump in a leak-detection system has allowed for the above-noted advantages and improvements as compared to the turbomolecular pump systems, since the outlet or exhaust pressure of the molecular drag pump is of the order of one-thousand times that of the turbomolecular pump: 30 torr as compared with 30 millitorr.

SUMMARY OF THE INVENTION

It is, therefore, the primary objective of the present invention to provide a leak detection system that eliminates the need of expensive and complex throttling valve structure, while also enhancing the overall sensitivity of the system to probe gas, leak detection.

It is another objective of the present invention to provide such a leak detection system that will allow for the detection of fine or gross leaks of a vacuum vessel without any adverse effect on the mass spectrometer sensing head associated with the leak detection system of the invention.

It is yet another objective of the present invention to enhance probe-gas detection sensitivity to the leak detection system of the invention by eliminating the possibility of oil-vapor contamination in the detection chamber of the mass spectrometer associated with the leak detection system of the invention.

It is still a further objective of the present invention to ensure that the leak detection system of the invention is readily capable of being used in repetitive fashion, so that after one leak has been detected, the system may be used immediately again to detect another leak.

It is also an objective of the present invention to allow the detection system of the present invention to be used for detecting other gases besides helium in other applications besides vacuum-vessel leak detection.

Toward these and other ends, the leak detection system of the present invention incorporates a molecular drag pump as the first vacuum-forming pump for evacuating the detection chamber of the mass spectrometer whose probe detects the presence of the probe gas helium leaking from a hole or crack of a vacuum vessel or container. The exhaust or outlet of the molecular drag pump is of the order of 30 torr, as compared with 30 millitorr of the turbomolecular pump or diffusion pump. The very much greater exhaust pressure of the molecular drag pump has obviated the need for complex throttling of the helium probe gas, as the pressure differentials from atmospheric (760 torr) to the exhaust of the turbomolecular pump are minute as compared to that of the turbomolecular or diffusion pump. In accordance with the present invention, the probe gas is introduce at the exhaust of the high vacuum pump—the molecular drag pump—for fine or minute leaks, just as in the case of the turbomolecular pump system. However, whereas in the turbomolecular pump system, the helium penetrates into the mass spectrometer detection chamber via molecular flow called molecular counter-flow or back diffusion, the probe helium gas penetrates into the mass spectrometer detection chamber via turbulent mixing or cavitation, since the outflowing helium probe gas is not molecular flow but a combination of turbulent, laminar and transitional flow. The present invention is also based on the discovery that light gases are very slowly pumped by a molecular pump, which discovery also has import to the general concept of separation of gases, and, therefore, to applications outside of helium, gas-probe leak detection, to any application requiring the detection or separation of one gas relative to others mixed therewith, which change of application is enabled by simple changes in systemic pressures associated with the exhaust port of the molecular drag pump, and the inlet and outlet pressures of the associated, back-up supporting pumps of the present invention for the high-vacuum, molecular drag pump of the invention. The present invention has substituted complex gas flow for the complex and expensive valving of the prior art systems. The high-vacuum, molecular drag pump of the invention is supported by a series of back pumps, a first pair of conventional diaphragm pumps, and a second pair of conventional piston pumps, all of these support pumps being series-connected together and with the molecular drag pump. Such an arrangement achieves a continual rebalancing of pressures and flows, and gradually brings the last exhaust up to atmospheric pressure. By this very arrangement, very large and gross leaks may be detected, which hitherto has not been possible, by simply introducing the helium probe gas leakage at one of the other exhaust outlets of the other pumps, rather than the exhaust outlet of the molecular pump. The helium probe gas, by the same principle of turbulent mixing or cavitation, will flow rearwardly through the pumping system until it finally reaches the mass spectrometer detection chamber for detection in the usual fashion. Since the exhaust pressure at any of the other support pumps is considerably greater than that of the exhaust of the molecular drag pump, and, of course, that of the turbomolecular pump of prior art systems, not only is probe gas detection possible, but even complex throttling is unnecessary, as compared with prior art systems where even with complex throttling, gross leaks are not detectable, since the introduction of the probe gas leakage would destroy the high-vacuum requirement of the exhaust port of the high-vacuum turbomolecular or diffusion pump. Also in accordance with the present invention, in order to allow for quick, repetitive use of the detection system for detecting another leak in a vacuum-vessel or container, an air-purge valve is provided at the molecular drag pump outlet, which air purging valve is operated after each leak-detection. This is necessary, since the helium is pumped at very slow speeds by the molecular drag pump and its supporting pumps, which tends to saturate the system with helium, the air purge eliminating the remaining helium so that the next test may be carried out.

BRIEF DESCRIPTION OF THE DRAWINGS

The invention will be more readily understood with reference to the accompanying drawing, wherein.

DETAILED DESCRIPTION OF THE INVENTION

Figure 1:
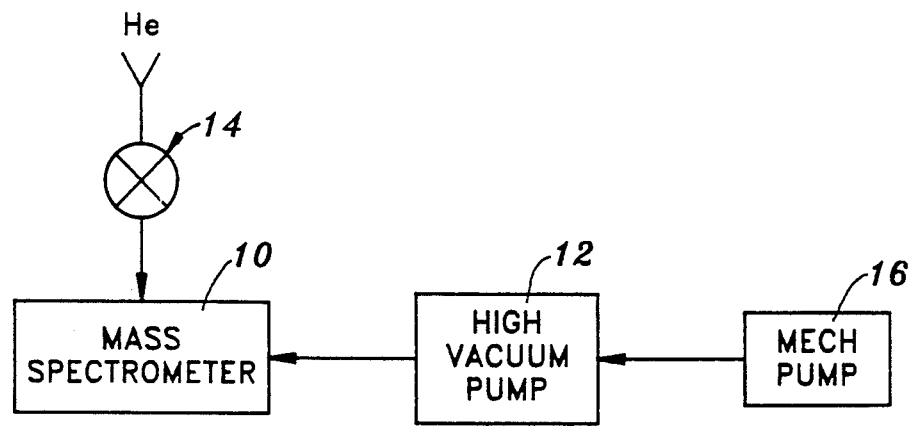
FIG. 1 is a schematic of the prior-art leak-detection system for detecting leaks in a vacuum-vessel or container.
Figure 2:
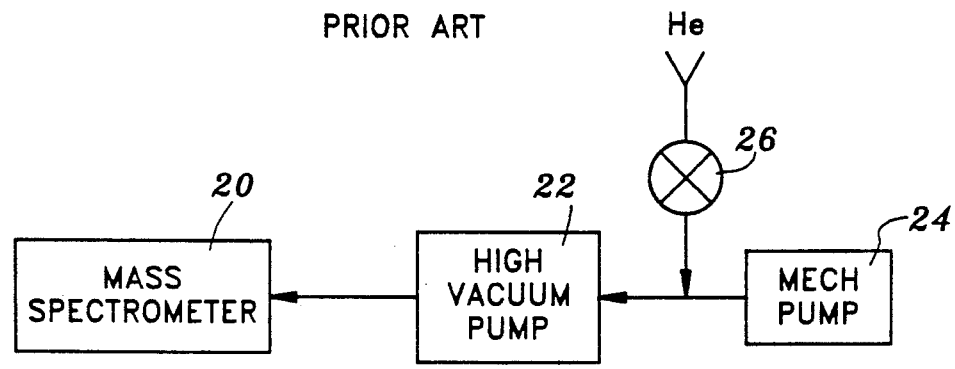
FIG. 2 is a schematic of another prior art leak-detection system for detecting leaks in a vacuum-vessel or container.

Referring now to the drawing in greater detail, FIGS. 1 and 2 show two prior-art leak-detection systems. The one shown in FIG. 1, which was the first helium probe gas, leak-detection system in widespread use, like all leak-detection systems, utilizes a conventional mass spectrometer analysis cell 10, which is tuned for the mass of helium ($m/e=4$, atomic weight). The probe gas, helium, is pumped into a vacuum vessel or container to be tested, with the sensing probe of the mass spectrometer 10 being used about the entire outer circumferential surface of the vessel or container to detect any outflow of helium, which would then indicate an origin of a leak in the vessel, which may then be repaired. Connected to the mass spectrometer 10 is a high-vacuum oil-diffusion pump 12, which creates a very high vacuum in the analysis cell's chamber, which high vacuum is typically less than 0.0002 millibar. The diffusion pump 12 typically has an exhaust pressure of 30 millitorr. Owing to the very high vacuum required, the probe helium cannot be allowed to enter freely into the analysis cell of the mass spectrometer, since such probe gas is exiting the vacuum vessel at or near atmospheric pressure, which would destroy the high vacuum of the cell, and would, thus, render such cell inoperative. To overcome such problems, the prior art system of FIG. 1 utilizes a specially-designed, complex and expensive throttling valve structure 14, which meters the flowing helium and allows for the transition from atmospheric to high vacuum to take place without adversely affecting the functioning of the analysis cell. The probe helium is directly introduced, via the throttling valve structure, into the analysis cell of the mass spectrometer. A mechanical support pump 16 is connected to the exhaust of the oil-diffusion pump to bring the exhaust up to atmospheric. The drawbacks with the system of FIG. 1 is not only the requirement for complex and expensive throttling valve structure, but the contamination from oil vapors effused into the system via the oil diffusion pump 12, which also necessitated the provision of liquid nitrogen traps to freeze out the oil vapors before reaching the cell's sensing head. This has meant that a large supply of liquid nitrogen must be provided and maintained, which is costly and difficult. The system of FIG. 1 is still in use to this day.

A more recent prior-art leak-detection system is shown in FIG. 2. This system utilizes a turbomolecular pump 22 to create the high vacuum in the analysis cell of the mass spectrometer 20. The turbomolecular 22 also operates at exhaust pressures of approximately 30 millitorr. The turbomolecular pump 22 must be backed by a mechanical pump 24, which is an oil-sealed pump, posing the potential problem of oil-vapor contamination as in the system of FIG. 1. The main difference between the system of FIG. 2 with respect to the system of FIG. 1 is that the probe helium gas is not introduced directly into the analysis cell of the mass spectrometer 20, but is introduced at the exhaust of the turbomolecular pump 22. The helium thus introduced flows back into the analysis cell chamber of the spectrometer 20 via what is called "counter-flow" or "back-diffusion" through the turbomolecular pump 22. The helium probe gas is introduced at the exhaust of the turbomolecular pump 22 via the same type of throttling valve structure 26 as that of the system of FIG. 1, such being a prerequisite to the operation of the system of FIG. 2, since the exhaust pressure of the turbomolecular pump is so low, that any introduction of the gas without such metering would make the system of FIG. 2 inoperative. The counter-flow of the helium probe gas is possible since the flow of the helium from the throttling valve 26 is molecular flow. Statistical thermodynamics governs such flow, ensuring the great probability that some of these molecules will flow backward through the pump and finally reach the sensing chamber of mass spectrometer for detection thereby. However, as explained, the system of FIG. 2 still requires the expensive and complex throttling of the gas into molecular flow, and still poses the same risk of oil-vapor contamination via the oil-sealed mechanical support pump 24, though the introduction of the probe gas at the exhaust of the high-vacuum pump 22 rather than directly into the sensing chamber of mass spectrometer decreases the chances of such oil contamination and of inoperativeness of the sensing chamber.

Figure 3:
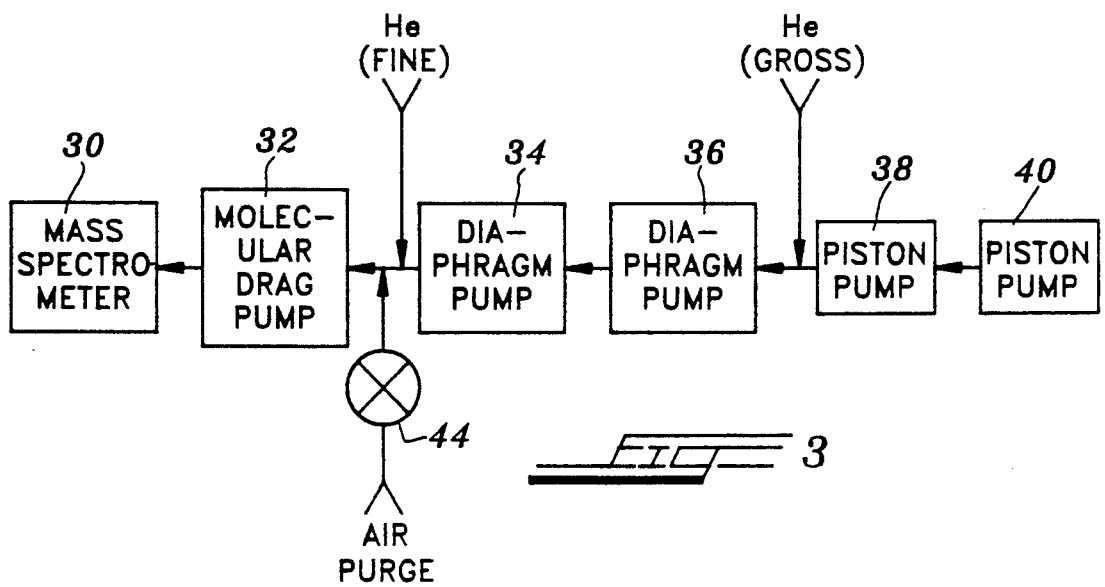
FIG. 3 is a schematic of the leak-detection system of the present invention for detecting leaks in a vacuum-vessel or container.

The leak-detection system of the present invention is shown schematically in FIG. 3, and includes a conventional mass spectrometer 30 with helium sensing cell, as in the prior-art systems. However, the high-vacuum pump for creating and sustaining the high vacuum in the sensing cell is a molecular drag pump 32, which is quite different from the oil diffusion pump 12 and turbomolecular pump 22. The flow through the molecular drag pump is axially, as compared to the transverse flow of the turbomolecular pump, and has an operating exhaust pressure of approximately 30 torr, as compared to the 30 millitorr of the diffusion pump and turbomolecular pump, which is of the order of one-thousand times greater. This much greater exhaust pressure of the molecular drag pump not only allows for the creation of the necessary vacuum in the analysis cell, but, also means that the flow at the exhaust thereof is not molecular but a combination of turbulent (viscous), laminar, and transitional flows. Thus, owing to this much greater exhaust pressure, and ensuing nonmolecular flow thereof, it is possible to introduce the probe helium gas at the exhaust of the molecular drag pump without the requirement of first throttling, since molecular flow at the exhaust of the high-vacuum pump is not an issue, as it is in the systems of FIGS. 1 and 2. Thus, in the present invention, the helium probe gas may be introduced into the detection system at the exhaust of the molecular drag pump without the need of expensive and complex throttling valve structure, and without the need of special helium-selective gas barriers, the equivalent of the complex throttling technique, but is introduced by simple and conventional tubing. The molecular drag pump 32 is backed by a series-connected, oil-free, dry, support pumps to gradually bring the system up to atmospheric at the outlet of the system. These support pumps are a pair of series-connected diaphragm pumps 34, 36 such as those manufactured by Thomas Industries, Inc. of Sheboygan, Wis., Model Nos. 2107CA, 2107CB, 2107CD, and a pair of series-connected piston pumps, 38 40, such as those manufactured by Thomas Industries, Inc., Model Nos. 004CA33, 004CD33M, 004CD33, and 004CC33. The molecular drag pump may be that manufactured by Alcatel Vacuum Products, Inc. of Hingham, Mass., model MDP 5010, which includes a Gaede-stage and a Holweck-stage in series. The use of these support pumps ensures that on the way to becoming atmospheric, the flowing media of the system experiences a continual rebalancing of flow and pressure between the pumps as the transition from high vacuum to atmospheric is achieved. The use of oil-free pumps also prevents the potential hazards of oil-vapor contamination, prevalent in prior-art systems.

In accordance with the present invention, the system of FIG. 3 introduces the helium probe gas between the exhaust outlet of the molecular drag pump 32 and the inlet port of the diaphragm pump 34. In this manner, there is a semblance to that of the system of FIG. 2, in that the helium probe gas is introduced between the high vacuum pump and a support pump. However, in the present invention, such introduction of the helium probe gas is achieved without costly and complex throttling valve structure, but introduced with the all of the naturally-occurring, complex flow characteristics thereof: Turbulent, laminar and transitional. According to the present invention, the helium is allowed to flow back into the sensing cell of the mass spectrometer 30 by the processes of cavitation and turbulent mixing. Thus, the complex flow patterns of the helium stream will ensure by these processes that some helium gas will travel rearwardly through the molecular pump and into the sensing cell of the mass spectrometer 30. Such flow is not molecular flow, as in the case of the "back-diffusion" or "counter-flow" of the system of FIG. 2, but is complex flow that includes turbulent flow and the ensuing mixing and cavitation achieved thereby, which forces some helium rearwardly through the molecular drag pump 32 by dynamic mixing. The molecular drag pump will pump heavier gases, such as air, quite easily and readily. However, it will pump only very slightly light gases, such as helium. Thus, the high vacuum, molecular drag pump 32 creates and sustains the high vacuum in the sensing cell of the mass spectrometer, but will not readily pump out the helium flowing backwardly therein, so that detection of the helium and the leak may be readily and very accurately achieved.

The helium, as mentioned above, is introduced into the system of the invention between the molecular drag pump 32 and the diaphragm pump 34. This is for fine or small leaks. The helium thus introduced will experience complex flow, including turbulence, which turbulence arises from viscous flow conditions, vortex conditions within the tubing connecting the helium to the system proper, and due to the mechanical action of the pumps. Before such helium is introduced, the system is in equilibrium with a no-flow state existing between the pumps. Upon the introduction of the helium stream, such equilibrium is destroyed, and a new "mixing" equilibrium will result, with the helium now dispersed along all of the different components of the system. The greater the pressure drop in any part of the system, the less helium present, although every part of the system will have helium present. Thus, it is possible to introduce the helium probe gas at any juncture in the system of FIG. 3, and still have some helium mix via dynamic mixing and flow rearwardly until it is present within the sensing cell of the mass spectrometer. As mentioned above, for fine leaks, the helium is introduced between the exhaust of the molecular drag pump 32 and the inlet port of the diaphragm pump 34. However, for large or gross leaks, hitherto not possible of detection by the prior-art systems, the helium probe gas is introduced between the exhaust port of one of the support pumps and the adjacent inlet port of the next support pump, such as, for example, between the exhaust of the diaphragm pump 36 and the inlet port of the piston pump 38, as shown in FIG. 3. Owing to the greater amounts being mixed with gross leaks as compared with fine leaks, introduction further upstream of the helium probe gas is possible in the system of the present invention, where the line pressures thereof are considerably greater than the exhaust port of the molecular drag pump 32, whereby the exhaust pressure, and thus the operation, of the high vacuum molecular drag pump 32 will not be adversely affected by a sudden introduction of a large volume of turbulent flow. For large or gross leaks, the probe gas may be injected between any two of the support pumps, depending upon the intensity of such leak. Since the helium is not readily pumped by the molecular drag pump, there is provided an air purge via valve 44. This valve is used after each leak-detection, and "flushes" the system clean from accumulated helium. If this air purge were not used, it would take days or even weeks for the molecular drag pump to pump out all of the helium accumulated in the sensing chamber. Operation of the conventional valve 44 provides a stream of atmospheric air into the system, entraining all of the helium molecules, and allowing for the pumping thereof, since air is readily pumped by the molecular drag pump 32, carrying along with it the entrained helium molecules. In the preferred embodiment, the air purge valve 44 is located at the exhaust of the molecular drag pump, where its effect is more immediate.

In the preferred embodiment of the invention, in use for detecting leaks in vacuum vessels via the probe gas helium, the equilibrium pressure at the exhaust of the molecular drag pump and at the inlet to the diaphragm pump 34 is 3.4 torr; the pressure at the exhaust outlet of the diaphragm pump 34 and the inlet port of the diaphragm pump 36 is 11 torr; the pressure at the exhaust port of the diaphragm pump 36 and the inlet of the piston pump 38 is 30 torr; the pressure at the exhaust of the piston pump 38 and the inlet of the piston pump 40 is 350 Torr; and the exhaust pressure of the outlet of the piston pump 40 is, of course, 760 torr, atmospheric. As stated, these are the operating pressures when the system of FIG. 3 is used as a vacuum leak-detection system and helium is the probe gas. However, the system of FIG. 3 may be used in other environments and applications, such as, for example, the separation of gases, such as hydrogen, from other gases; for separating gases from holes bored in the earth; and in nuclear reactors for separation of gases. This is accomplished since the molecular drag pump will pump light gases very slowly, if at all, while readily and speedily pumping heavier gases. By the selecting the appropriate operating pressures and pumping speeds of the pumps 32–40 of the system of the invention, a chosen light gas may be separated from ambient gas or carrier-gas by the same process of dynamic mixing and reverse flow, as described above. In simple gas separation applications, the mass spectrometer 30 is not needed, and is replaced with a storage container for storing the separated gas. Depending upon the flow conditions of the injected stream, such injected stream may be inputted or introduced between two adjacent pumps of the series of pumps 32–40. In the preferred embodiment of leak-detection, the gas inputted or introduced is helium mixed with air, and the separation that occurs is the helium from the air, which is readily achieved since the molecular drag pump will readily and quickly pump air but will not do so for helium. The same principle applies in all other applications, where the one gas to be separated by the system of FIG. 3 is not readily pumped by the molecular drag pump or is pumped at least slower than the remaining gas or gases from which separation is occurring. Each application of the present invention will require its own unique set of operating pressure for the inlets and outlets of the pumps 32–40, as well as unique pumping speeds thereof, whereby these pressures and speeds will vary depending upon the particular gas being separated and the environment in which the gas is found. Thus, it may be seen that the present invention has a wide application, applicable not only to vacuum-vessel leak-detection, but broadly to the separation of gases in general, as long as the gases being separated have different molecular weights.

While a specific embodiment of the invention has been shown and described, it is to be understood that numerous changes and modifications may be made therein without departing from the scope, spirit and intent of the invention as set forth in the appended claims.

What I claim is:

1. A gas-separating system comprising:
   a first pump having an inlet and an exhaust;
   a second support pump having an inlet connected to said exhaust of said first pump, and an exhaust;
   means for introducing a mixture of gases to said exhaust of said first pump, said mixture of gases comprising a first gas having a molecular weight and at least one other gas having a greater molecular weight than said first gas; said means for introducing a mixture of gases injecting the mixture with dynamic flow conditions having nonmolecular, viscous flow characteristics, whereby said first gas can be separated out by flowing upstream through said first pump from said exhaust thereof to said inlet thereof for subsequent collection, and whereby said at least one other gas of greater molecular weight is pumped out through said second support pump; and means for collecting said first gas separated out from said mixture of gases, said means for collecting being operatively associated with said inlet of said first pump.

2. The gas-separating system according to claim 1, further comprising means for purging said system of said first gas after said first gas has been separated, said means for purging being operatively connected between said first pump and said second support pump.

3. The gas-separating system according to claim 1, further comprising a plurality of tertiary pumps connected to said exhaust of said second support pump for bringing the exhaust of the system up to ambient pressure; each said tertiary pump having an inlet and an exhaust; said means for introducing also injecting said mixture of gases into at least one said exhaust of one of said second support pump and tertiary pumps for gas mixtures having gross flows.

4. A method of separating one gas from at least one other gas of heavier molecular weight, comprising:
   introducing into a conduit a mixture of gases, which mixture has one gas having a molecular weight mixed with at least one other gas of heavier molecular weight, downstream of a pump;
   said step of introducing comprising injecting the mixture into a conduit with dynamic flow characteristics having dynamic flow conditions having nonmolecular, viscous flow characteristics,
   waiting a period of time, dependent upon the molecular weight of said one gas, for dynamic mixing to take place by which said one gas of lighter molecular weight is separated out of the mixture and is allowed to flow upstream through the pump from the exhaust thereof through the inlet thereof, and
   collecting said one gas after its emanation from the inlet of the pump.

5. The method according to claim 4, wherein said step of introducing comprising directing the mixture of gases between the exhaust of a first pump and the inlet of a second pump.

6. The method according to claim 5, further comprising purging the first and second pumps of said one gas after said step of collecting, in order to remove any residue of said first gas in the pumps, whereby the system is ready for further gas-separating processing.

* * * * *